No. 687,183. Patented Nov. 19, 1901.
E. O. KOLANDER.
ADJUSTING DEVICE FOR CAMERAS, &c.
(Application filed Mar. 2, 1901.)
(No Model.)
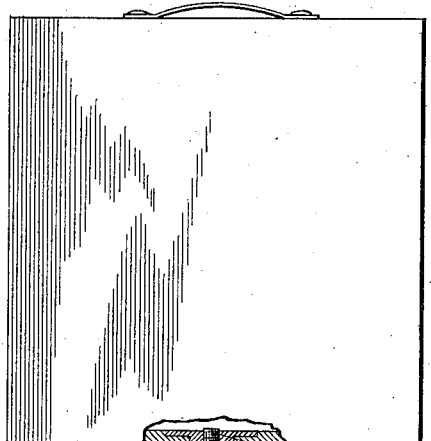
Fig. 1.
Fig. 2.
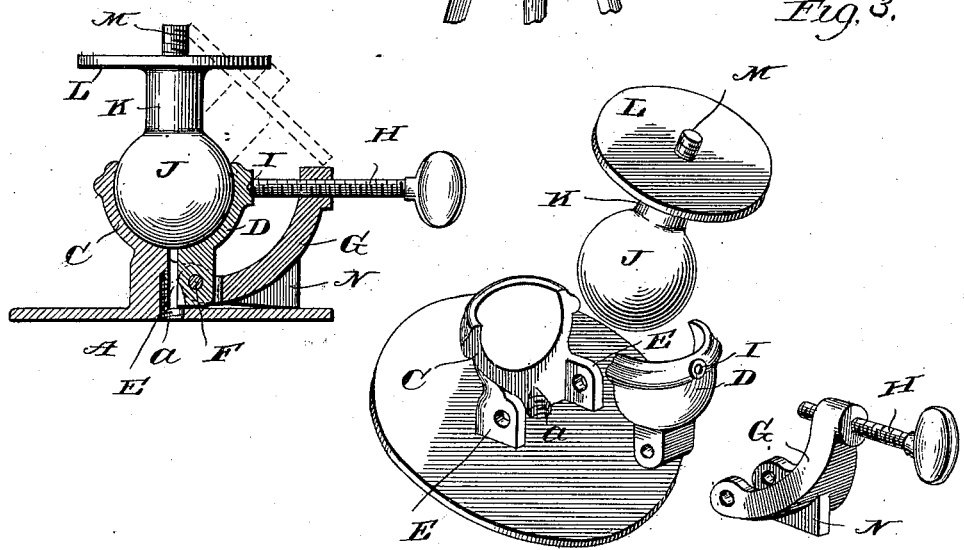
Fig. 3.
Witnesses
G. A. Rauberschmidt
J. H. Glendening
Inventor
Emil O. Kolander
By Wm. O. Belt, Atty.
THE NORRIS PETERS CO., PHOTO-LITHO., WASHINGTON, D. C.

UNITED STATES PATENT OFFICE.

EMIL O. KOLANDER, OF CHICAGO, ILLINOIS, ASSIGNOR OF ONE-HALF TO MAX POMPER, OF CHICAGO, ILLINOIS.

ADJUSTING DEVICE FOR CAMERAS, &c.

SPECIFICATION forming part of Letters Patent No. 687,183, dated November 19, 1901.

Application filed March 2, 1901. Serial No. 49,587. (No model.)

*To all whom it may concern:*

Be it known that I, EMIL O. KOLANDER, a citizen of the United States, residing at Chicago, in the county of Cook and State of Illinois, have invented certain new and useful Improvements in Adjusting Devices for Cameras, &c., of which the following is a specification.

My invention relates to certain new and useful improvements in adjusting devices for cameras and other instruments which are required to be adjusted to or from a horizontal plane.

The primary object of the invention is to provide an adjusting device between a camera and its tripod of simple construction and capable of being easily and readily manipulated to adjust and hold the camera rigidly therewith in any desired position.

With this and other ends in view the invention consists in the novel construction and arrangement of parts hereinafter described, and illustrated in the accompanying drawings, in which—

Figure 1 is an elevation showing the application of my improved adjusting device to a camera and its tripod, the camera being partly broken away. Fig. 2 is a sectional view of the adjusting device. Fig. 3 is a dissembled view of the adjusting device, showing all the parts thereof.

Referring to the drawings, in which like letters of reference denote corresponding parts in all of the figures, A designates the base of the device, which is preferably of circular form and arranged to rest upon the top plate B of a tripod, being secured thereto by a screw-bolt (not shown) which passes up through the top plate of the tripod and screws into the opening *a* of the base. The socket member of the adjusting device is mounted on this base to receive a ball member secured to the camera, thereby providing an adjustable ball-and-socket connection between the camera and the tripod. The socket member consists of a stationary section C, mounted on the base A, and a movable section D, which is pivotally secured in the lugs E by means of a pivot-pin F. A curved arm G is also pivotally mounted on this pivot-pin and projects outwardly and upwardly adjacent to the movable section and carries a thumb-screw H, which is arranged to bear against the movable section of the socket member. The movable section may be provided with a small recess I to receive the end of the thumb-screw. The ball member comprises a ball J, which is connected by a neck K with a plate L, on which the camera or other instrument rests. This member is also provided with a screw-bolt M to enter a threaded socket in the camera in the manner shown in Fig. 1. This being the general construction of my invention, it will be observed that I provide a novel device of simple construction and few parts, all combined and arranged to be operated quickly and effectively to adjust and lock the camera or other instrument in any desired position and at any inclination. The movable section of the socket member operates as the movable part of a clamp, and the curved arm G holds the adjusting thumb-screw in proper relation to this movable section throughout its limit of movement, said arm being provided with a supporting-lug N, which engages the base. By loosening the thumb-screw the socket member can be opened sufficiently to enable a further adjustment of the ball member therein, after which the screw is tightened to clamp the movable section D against the ball to lock the ball in the socket.

I am aware that changes in the specific details of construction of the device may be made without departing from the spirit or sacrificing the advantages of the invention, and I therefore reserve the right to make such changes as fall within the scope of the invention.

While I have shown the invention adapted to a camera and its tripod, it will be understood that I do not thereby limit the invention to this application, as it is apparent that it may be employed wherever a ball-and-socket connection is used.

Having thus fully described the invention, what I claim, and desire to secure by Letters Patent, is—

1. An adjusting device comprising a socket member having a stationary section and a movable section, a pivoted curved arm arranged in adjacent relation to and separate from the movable socket-section, and a horizontally-arranged thumb-screw carried by said arm and operating in engagement with the movable socket-section, substantially as described.

2. An adjusting device comprising a ball member, a socket member having a stationary socket-section, ears at the base of said section, a movable socket-section pivotally supported in said ears, a pivoted arm supported in adjacent relation to the movable section, and a thumb-screw carried by and operating through said arm against the movable section of the socket member, substantially as described.

EMIL O. KOLANDER.

Witnesses:
 WM. O. BELT,
 PAUL SCHMECHEL.